United States Patent
Hoshii

(10) Patent No.: US 7,564,603 B2
(45) Date of Patent: Jul. 21, 2009

(54) OUTPUT DATA GENERATING IMAGE PROCESSING

(75) Inventor: Jun Hoshii, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 570 days.

(21) Appl. No.: 11/369,735

(22) Filed: Mar. 8, 2006

(65) Prior Publication Data
US 2006/0250413 A1 Nov. 9, 2006

(30) Foreign Application Priority Data
Mar. 11, 2005 (JP) ............................. 2005-068388

(51) Int. Cl.
*G03F 3/08* (2006.01)
(52) U.S. Cl. .................... 358/518; 358/1.9; 345/591
(58) Field of Classification Search .............. 358/1.9, 358/518; 345/591
See application file for complete search history.

(56) References Cited

U.S. PATENT DOCUMENTS

| 5,349,452 | A | * | 9/1994 | Maeda et al. | 358/527 |
| 5,432,906 | A | | 7/1995 | Newman et al. | |
| 7,088,472 | B1 | * | 8/2006 | Okubo et al. | 358/2.1 |
| 7,339,699 | B1 | * | 3/2008 | Suzuki et al. | 358/1.9 |
| 2001/0040998 | A1 | * | 11/2001 | Roetling | 382/162 |
| 2002/0039191 | A1 | * | 4/2002 | Kinoshita | 358/1.9 |
| 2003/0197879 | A1 | * | 10/2003 | Terashita | 358/1.9 |
| 2004/0252345 | A1 | * | 12/2004 | Uekusa et al. | 358/2.1 |

\* cited by examiner

*Primary Examiner*—Mark K Zimmerman
*Assistant Examiner*—Miya J Cato
(74) *Attorney, Agent, or Firm*—Sughrue Mion, PLLC

(57) ABSTRACT

An image processing device generates output data used when an image displayed on a display device is to be output by an output device. The image processing device includes an output execution instruction input unit and a color space converter. The output execution instruction input unit inputs an instruction to execute image output via the output device. The color space converter carries out a first conversion process and a second conversion process. The first conversion process converts first device-dependent image data that expresses an image in a first device-dependent color space handled by the display device into device-independent image data that expresses the image in a device-independent color space. The second conversion process converts the device-independent image data into second device-dependent image data as the output data that expresses the image in a second device-dependent color space handled by the output device. The color space converter initiates the first conversion process prior to an input of an instruction to execute output by the output execution instruction input unit. The color space converter initiates the second conversion process in response to the input of an instruction to execute output by the output execution instruction unit.

4 Claims, 12 Drawing Sheets

OUTPUT DATA GENERATING IMAGE PROCESSING

CROSS REFERENCE TO RELATED APPLICATIONS

The present application claims the priority based on Japanese Patent Application No. 2005-68388 filed on Mar. 11, 2005, the disclosure of which is hereby incorporated herein by reference in its entirety.

BACKGROUND

1. Technical Field

The present invention relates to an image processing technology to generate output data used when an image displayed on a display device is to be output by an output device.

2. Description of the Related Art

In general, in order to match colors between devices such as a monitor and a printer, a color matching process is used. Where color matching is carried out in order to print on a printer an image displayed on a monitor, for example, first, the image data expressed in a color space used for monitor display is converted, using a monitor device profile, into image data expressed in a device-independent color space (e. g., the L*a*b* color space). The post-conversion image data is further converted, using a printer device profile, into printer output image data expressed in a color space used for printer output. By printing the image using the printer output image data generated in this fashion, the color of the printed image can be matched to the color of the image displayed on the monitor.

Here, a device profile describes information pertaining to the color reproduction of a device. A device profile includes an association table that associates color data in a color space that depends on a device (a device-dependent color space), such as a color space used for the monitor display or printer output described above, with color data in a color space that does not depend on a device (a device-independent color space), such as the L*a*b* color space described above. A device-independent color space is also called a PCS (Profile Connection Space).

Where color matching is to be performed for printing onto a printer an image displayed on a monitor, two color space conversion processes are executed: (1) color space conversion to convert color data in the device-dependent color space used by the monitor into color data in a device-independent color space, and (2) color space conversion to convert the color data in the device-independent color space into color data in the device-dependent color space used by the printer.

These two color space conversion processes are executed after a print execution instruction is input. In other words, when a print execution instruction is input, the monitor display image data is converted into image data expressed in a device-independent color space, this converted image data is then converted into printer output image data, and finally printing is carried out using the generated printer output image data.

A technology is described in U.S. Pat. No. 5,423,906 in which, in order to shorten the print processing time from the time of input of the print execution instruction, a profile is created by combining the monitor device profile and the printer device profile, and the monitor display image data is converted directly into the printer output image data using this combined profile without using device-independent color space color data. In general, the time required for combining two device profiles is usually shorter than the time required for a single image data color space conversion operation. Consequently, in this technology, the processing time after input of a print execution instruction is shorter than in the case where two separate color space conversion operations are carried out.

However, in the above technology, because combining the two device profiles results in the loss of a certain amount of device profile information, there may be a deterioration in the accuracy of color matching. Furthermore, in the above technology, because the processes of combining the two device profiles and carrying out color space conversion based on the combined profile are carried out after input of a print execution instruction, there is room to further reduce the processing time associated with output following input of the print execution instruction.

This problem does not arise only where color matching is performed between a monitor and a printer, and may occur when color matching is performed between any two devices that include an output device.

SUMMARY

An object of the present invention is to provide a technology that enables the processing time associated with output following input of a print execution instruction to be shortened while limiting deterioration in the accuracy of color matching where color matching is performed between two devices that include an output device.

In one aspect of the present invention, there is provided an image processing device for generating output data used when an image displayed on a display device is to be output by an output device. The image processing device comprises an output execution instruction input unit and a color space converter. The output execution instruction input unit inputs an instruction to execute image output via the output device. The color space converter carries out a first conversion process and a second conversion process. The first conversion process converts first device-dependent image data that expresses an image in a first device-dependent color space handled by the display device into device-independent image data that expresses the image in a device-independent color space. The second conversion process converts the device-independent image data into second device-dependent image data as the output data that expresses the image in a second device-dependent color space handled by the output device. The color space converter initiates the first conversion process prior to an input of an instruction to execute output by the output execution instruction input unit. The color space converter initiates the second conversion process in response to the input of an instruction to execute output by the output execution instruction unit.

In this image processing device, the color space conversion process to convert the first device-dependent image data into the device-independent image data is initiated prior to an input of an output execution instruction. And the only color space conversion process to convert the device-independent image data into second device-dependent image data is initiated after the input of the output execution instruction. Consequently, the processing time associated with output following the input of the output execution instruction can be shortened. Furthermore, in this image processing device, color matching is performed not by a single color space conversion process that uses a profile generating by combining two different profiles, but by a color space conversion process that converts device-dependent image data into device-independent image data together with a color space conversion process that converts the device-independent image data into device-dependent image data. Consequently, deterioration in the accuracy of color matching can be minimized. Therefore, where color matching is to be carried out between two devices that include an output device, the processing time associated with output following input of an output execution instruction can be shortened while preventing deterioration in the accuracy of color matching.

The present invention can be realized in various aspects. For example, the present invention can be realized in aspects such as an image processing method and associated device, an image conversion method and associated device, an image output method and associated device, an output data generating method and associated device, a printing method and associated device, a computer program for effecting the functions of such methods or devices, a recording medium for recording such a computer program, and data signals in which such a computer program is carried on the carrier wave.

These and other objects, features, aspects, and advantages of the present invention will become more apparent from the following detailed description of the preferred embodiments with the accompanying drawings.

DESCRIPTION OF THE PREFERRED EMBODIMENT

Figure 1:
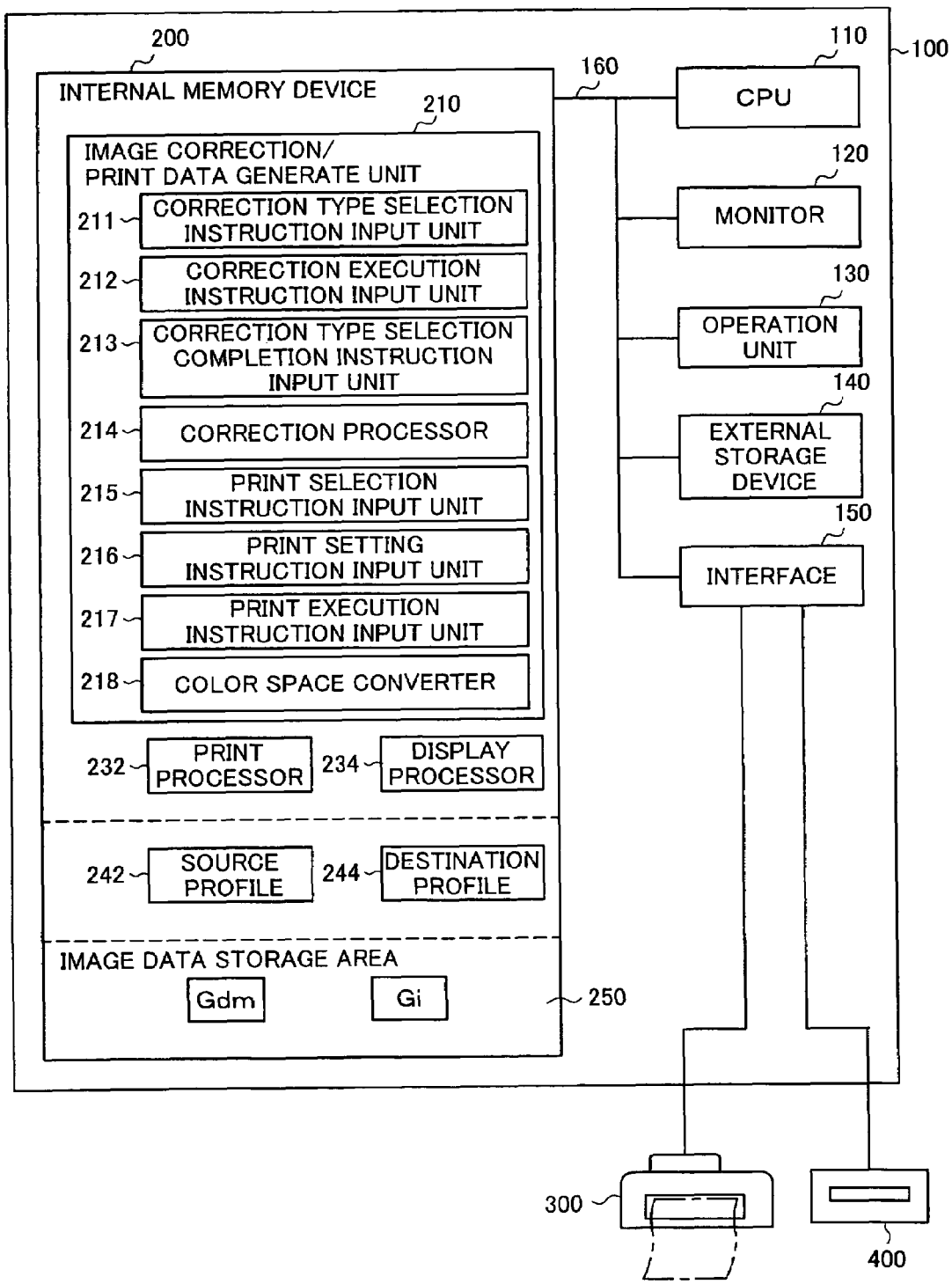
FIG. 1 is a block diagram showing schematically the construction of an image processing device in a first embodiment of the present invention.

Next, aspects of the present invention will be described in the following order on the basis of embodiments:
A. First Embodiment
B. Second Embodiment
C. Third Embodiment
D. Fourth Embodiment
E. Variations A. First Embodiment FIG. 1 is a block diagram showing schematically the construction of an image processing device in a first embodiment of the present invention. The computer 100 as an image processing device in the first embodiment includes a CPU 110, a monitor 120 as a display device, operation unit 130 such as a keyboard and a mouse, an external storage device 140 such as a hard disk drive, an interface 150, and an internal memory device 200 such as a ROM or RAM. The constituent elements of the computer 100 are interconnected via a bus 160.

The interface 150 includes a plurality of I/O terminals, and exchanges data with external devices. For example, the interface 150 is connected to a CD-R/RW drive 400 via a cable, and executes reading of data recorded on the CD-R/RW drive 400 and writing of data thereto. Furthermore, the interface 150 is connected via a cable to a printer 300 as an output device, and supplies print data to the printer 300.

Stored on the internal memory device 200 are an image correction/print data generate unit 210, a print processor 232 and a display processor 234. The image correction/print data generate unit 210 is a computer program that, under the control of a prescribed operating system, executes an image correction/print data generating process described below that performs image correction and generates image data to be used by the printer 300 to print the corrected image. The print processor 232 is a printer driver that controls the printer 300. The display processor 234 is a monitor driver that controls the monitor 120. The CPU 110 executes the image correction/ print data generating process and controls the operation of the printer 300 and monitor 120 by calling out these programs from the internal memory device 200.

The image correction/print data generate unit 210 includes as modules a correction type selection instruction input unit 211, a correction execution instruction input unit 212, a correction type selection completion instruction input unit 213, a correction processor 214, a print selection instruction input unit 215, a print setting instruction input unit 216, a print execution instruction input unit 217 and a color space converter 218. The functions of these various modules will be described in detail below in connection with the description of the image correction/print data generating process.

Stored on the internal memory apparatus 200, either in advance or during the image correction/print data generating process described below, are a source profile (SP) 242 and a destination profile (DP) 244. The source profile 242 is a device profile used to convert image data expressed in a device-dependent color space into image data expressed in a device-independent color space. In this embodiment, a source profile 242 is used in which the RGB color space used by the monitor 120 (termed the 'monitor RGB color space (RGBm color space)') is set as the device-dependent color space and the L*a*b* color space is set as the device-independent color space. The destination profile 244 is a device profile used for converting image data expressed in a device-independent color space into image data expressed in a device-dependent color space. In this embodiment, a destination profile 244 is used in which the L*a*b* color space is set as the device-independent color space and the RGB color space used by the printer 300 (termed the 'printer RGB color space (RGBp color space)') is set as the device-dependent color space. In this embodiment, the source profile 242 and destination profile 244 are used in a 3D format. In this specification, image data expressed in a device-dependent color space is termed 'device-dependent image data', while image data expressed in a device-independent color space is termed 'device-independent image data'. In general, a device-independent color space is also called a PCS (Profile Connection Space), and device-independent image data is termed PSC data.

The internal memory device 200 has an image data storage area 250. Various types of image data are stored in the image data storage area 250 during the image correction/print data generating process described below.

Figure 2:
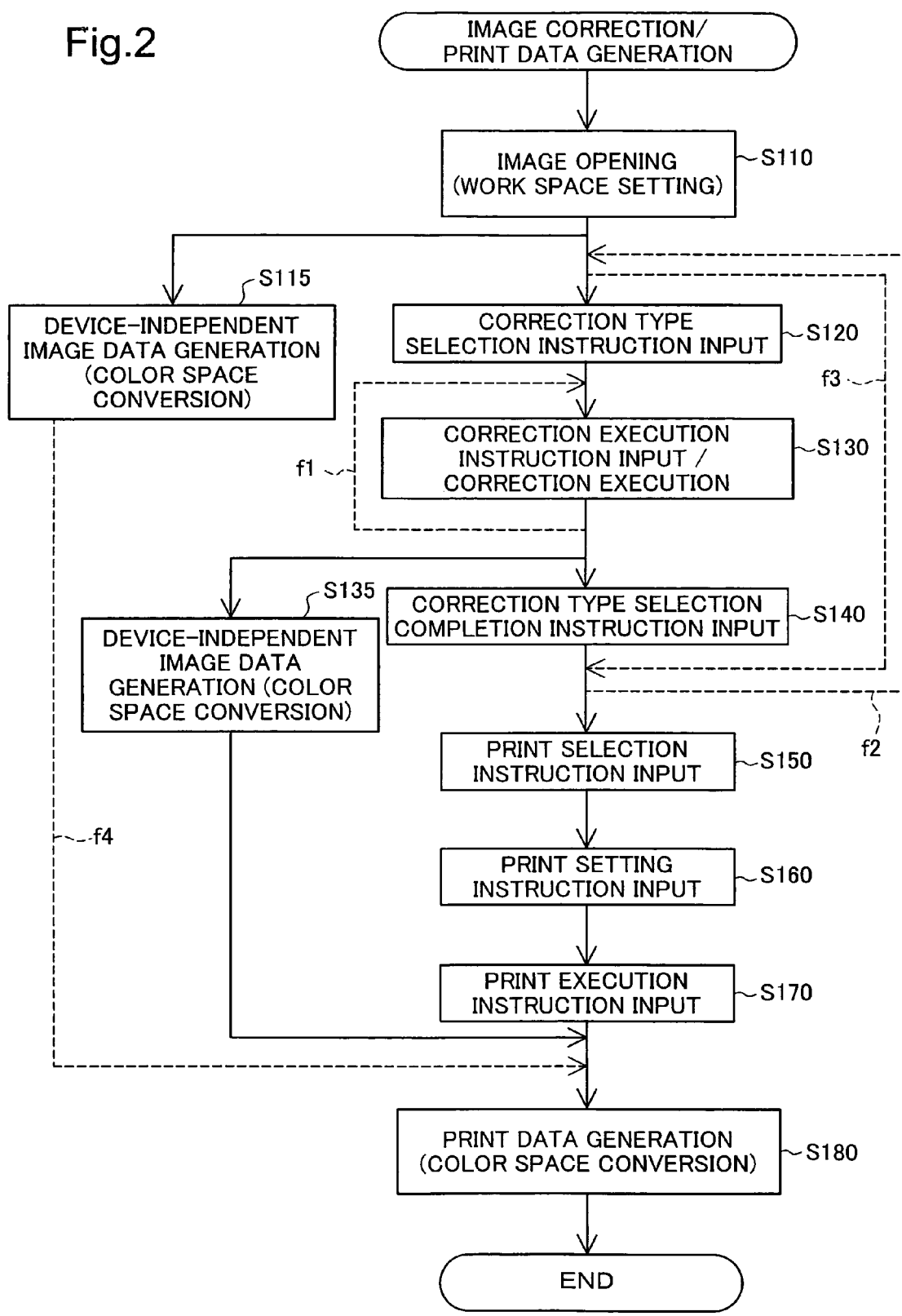
FIG. 2 is a flow chart showing the flow of the image correction/print data generating process executed by the image processing device in the first embodiment.
Figure 3:
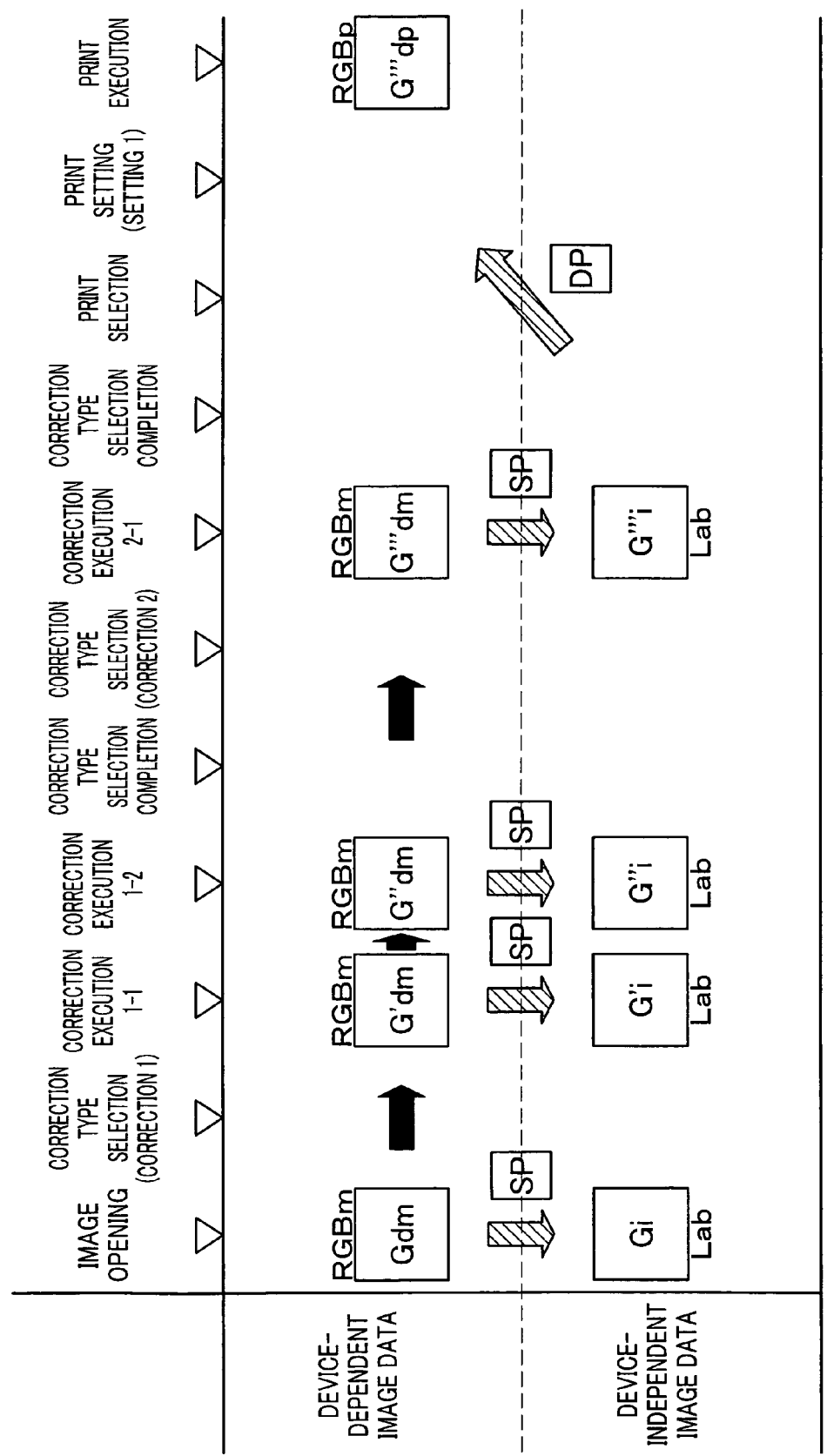
FIG. 3 is a diagram showing a summary of the image correction/print data generating process executed by the image processing device in the first embodiment.

FIG. 2 is a flow chart showing the flow of the image correction/print data generating process executed by the image processing device in the first embodiment. FIG. 3 is a diagram showing a summary of the image correction/print data generating process executed by the image processing device in the first embodiment. The image correction/print data generating process is a process in which image correction is performed and print data to be used by the printer 300 (FIG. 1) to print the corrected image is generated, as described above. In the image correction/print data generating process of this embodiment, color matching is carried out between the monitor 120 (FIG. 1) and the printer 300. In FIG. 3, the flows of the image correction/print data generating process is shown in the left to right direction, and the various images generated at each point in time during the image correction/print data generating process are shown.

In step S110 (FIG. 2), the image correction/print data generate unit 210 (FIG. 1) sets a work space and opens an image. This process is executed when the user selects image data stored in the external storage device 140 or the CD-R/RW drive 400 (FIG. 1) and inputs an instruction to open an image representing this image data. Here, a work space refers to a color space to be used when the image correction/print data generate unit 210 opens the image. In this embodiment, the image data for the opened image is expressed in the monitor RGB color space (i.e., the RGBm color space), and the RGBm color space is set as the work space. The opened image data selected by the user is stored in the image data storage area 250 (FIG. 1).

Figure 4:
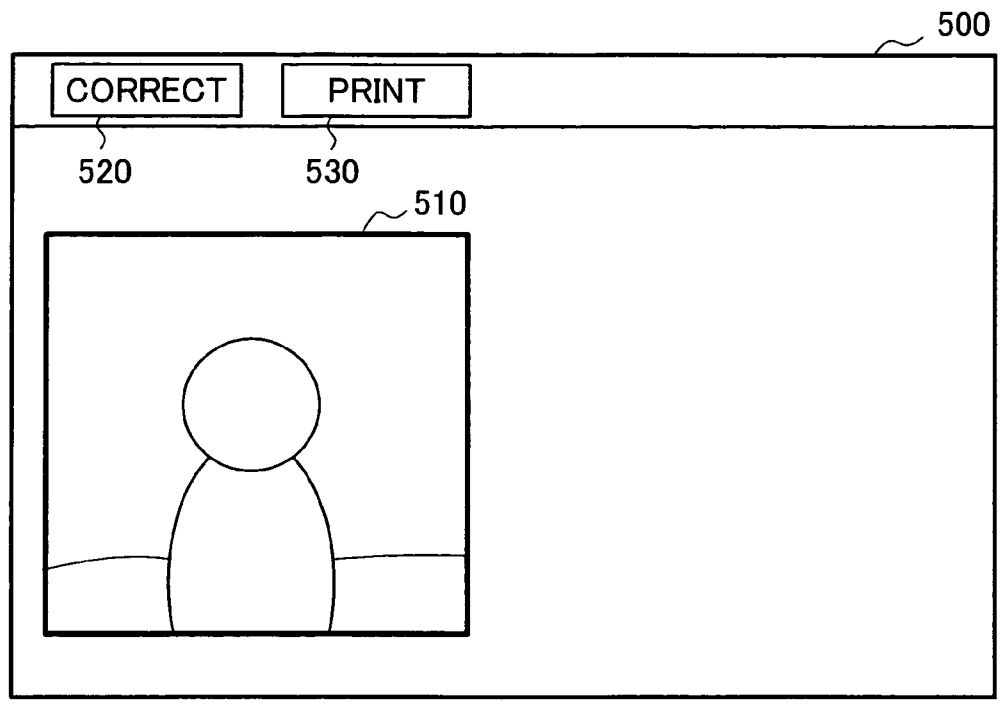
FIG. 4 is a diagram showing an example of a monitor display screen that appears during the image correction/print data generating process.

When the image is opened, the image is displayed on the monitor 120 (FIG. 1). FIGS. 4 through 7 are diagrams showing examples of the monitor display screen during the image correction/print data generating process. As shown in. FIG. 4, the opened image is displayed on the image display area 510 of the monitor display screen 500.

In step S115 (FIG. 2), the color space converter 218 performs color space conversion of the image data for the image displayed in the screen display area 510 (FIG. 4) to generate device-independent image data. This color space conversion process is executed using the source profile 242 used for conversion from the monitor RGB color space (RGBm color space) to the L*a*b* color space, and the device-independent image data is expressed in the L*a*b* color space. FIG. 3 shows a situation where the image data opened in step S110 (expressed as 'Gdm') undergoes color space conversion using the source profile (SP) 242 to generate the device-independent image data (expressed as 'Gi'). The generated device-independent image data Gi is stored in the image data storage area 250 (FIG. 1). The various image data generated in subsequent steps is stored in the image data storage area 250 as well.

In step S120 (FIG. 2) executed at the same time as step 115, the correction type selection instruction input unit 211 (FIG. 1) inputs a correction type selection instruction in response to user operation. Here, 'correction type' refers to a type of image correction that can be executed by the image correction/print data generate unit 210. Correction types can include tone curve correction, color balance correction, histogram correction, level correction, brightness correction, contrast correction, sharpness correction, and various other types of correction. A correction type selection instruction indicates the correction type selected by the user from among the plurality of correction types that can be executed by the image correction/print data generate unit 210. In this embodiment, a correction type selection instruction is input via the selection of the correction button 520 on the monitor display screen 500 (FIG. 4) and one of the correction type selection buttons 542 contained in the correction type selection dialog box 540 (FIG. 5) displayed as a result of the selection of the correction button 520.

Figure 5:
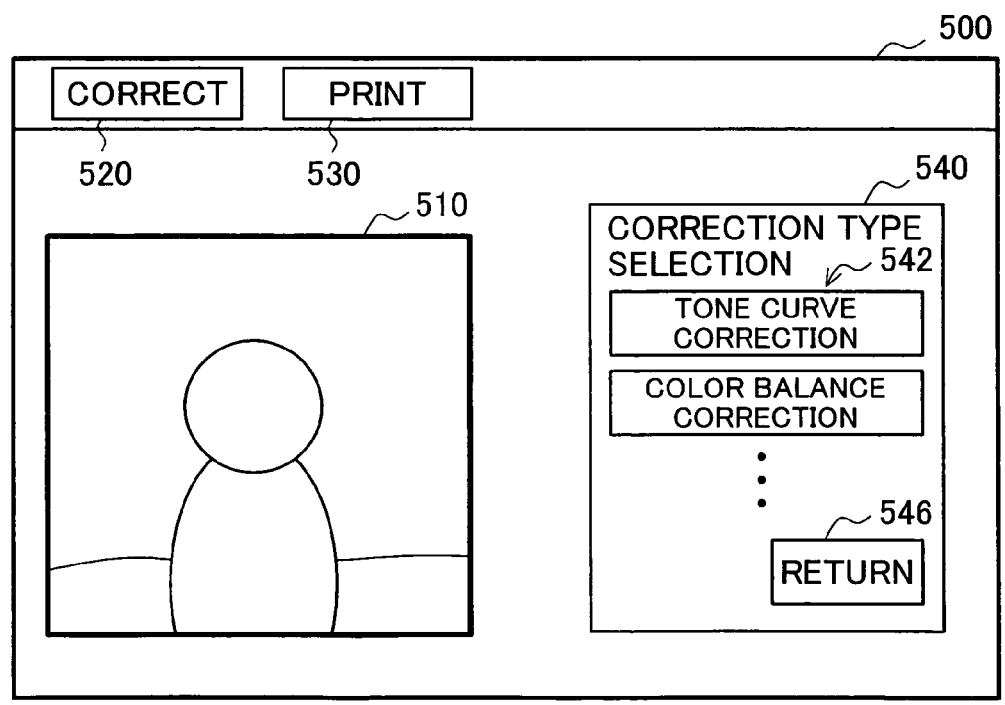
FIG. 5 is a diagram showing an example of a monitor display screen that appears during the image correction/print data generating process.

In step S130 (FIG. 2), the correction execution instruction input unit 212 inputs a correction execution instruction in response to user operation, and the correction processor 214 (FIG. 1) corrects the image data for the image displayed in the image display area 510 (FIG. 5). A correction execution instruction includes instructions regarding parameter values used to execute correction in accordance with the type of correction to be executed and an instruction to initiate correction. In this embodiment, when one of the correction type selection buttons 542 (FIG. 5) is selected, the correction execution dialog box 550 used for the selected correction type (in FIG. 6, tone curve correction is used as an example) is shown on the monitor display screen 500. The correction execution instruction is input by specifying parameter values in the parameter value specification screen 552 in the correction execution dialog box 550 and selecting the correction execution button 554.

Figure 6:
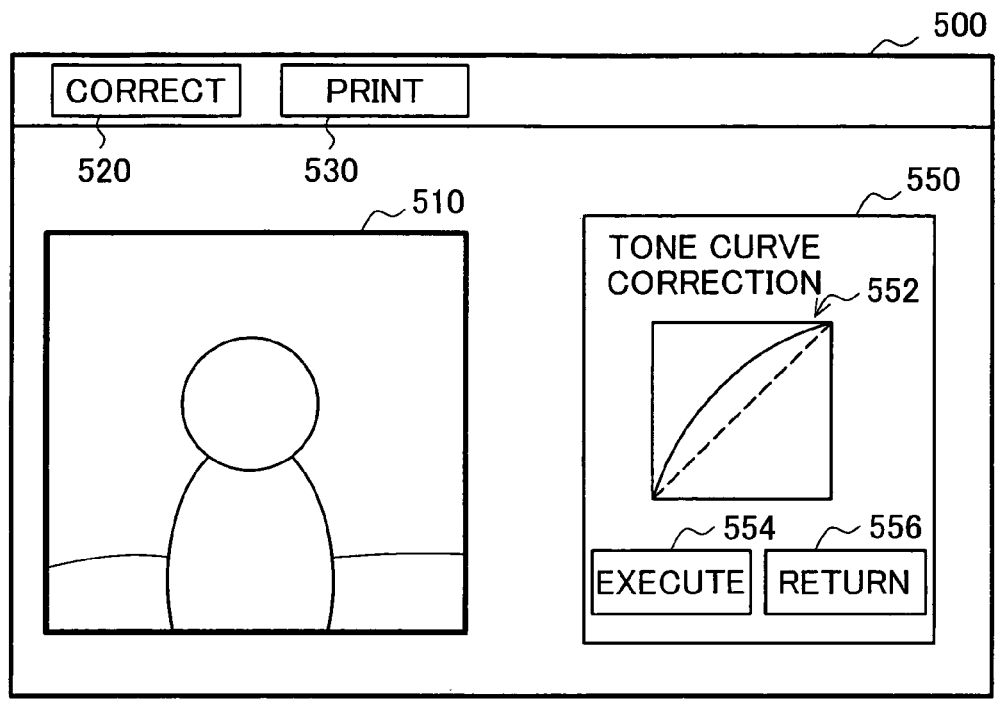
FIG. 6 is a diagram showing an example of a monitor display screen that appears during the image correction/print data generating process.

The correction processor 214 (FIG. 1) executes the selected correction process using the specified parameter values. FIG. 3 shows a situation in which image data G'dm is generated from image data Gdm via this correction process (expressed as 'correction 1-1'). When this correction process is completed, the image expressed by this corrected image data is displayed in the image display area 510 (FIG. 6) of the monitor display screen 500. The user can obtain a desired image by executing the correction process while checking the corrected image displayed in the image display area 510 (FIG. 6).

In step S135 (FIG. 2), the color space converter 218 (FIG. 1) performs color space conversion of the image data that underwent correction in step S130 to generate device-independent image data. This color space conversion is identical to the color space conversion performed in step S115, and is executed using the source profile 242 (FIG. 1). FIG. 3 shows a situation in which device-independent image data G'i is generated via the execution of color space conversion to the device-dependent image data G'dm.

Here, the processing of step S130 may be repeated, as indicated by the dashed arrow f1 in FIG. 2. In other words, correction using the correction type selected in step S120 may be executed multiple times. The correction processes from the second correction onward are carried out with respect to image data that was generated by the previous correction process. FIG. 3 shows a situation in which image data G"dm is generated by subjecting the image data G'd generated as a result of the first image correction (correction 1-1) to a second image correction (correction 1-2).

In this embodiment, every time correction is performed in step S130, color space conversion processing is initiated with respect to the corrected image data in step S135, thereby generating device-independent image data. In other words, in this embodiment, in response to the completion of image correction of the device-dependent image data, color space conversion processing is initiated in order to convert the image-corrected device-dependent image data into device-independent image data. FIG. 3 shows a situation in which the device-dependent image data G"dm is converted into device-independent image data G"i.

In step S140 (FIG. 2), the correction type selection completion instruction input unit 213 (FIG. 1) inputs a correction type selection completion instruction in response to user operation. A correction type selection completion instruction is an instruction to end the state in which correction type selection is carried out. In this embodiment, a correction type selection completion instruction is input via the selection of the end button 556 in the correction execution dialog box 550 (FIG. 6). By inputting a correction type selection completion instruction, image correction based on the selected correction types is approved.

Here, the operations from step S120 to step S140 may be repeated, as indicated by the dashed arrow f2 in FIG. 2. For example, after the operations from step 120 to step S140 are executed for a given correction type, these operations may be executed once more for the same or a different correction type. FIG. 3 shows a situation in which, after correction type selection is completed, a correction type is selected once more, and image data G'''dm is generated by performing another correction operation (expressed as 'correction 2-1').

When the operations from step S120 (FIG. 2) to step S140 are performed once more, color space conversion is carried out to the corrected image data and device-independent image data is generated in step S135. FIG. 3 shows a situation in which device-independent image data G'''i is generated from device-dependent image data G'''dm.

Figure 7:
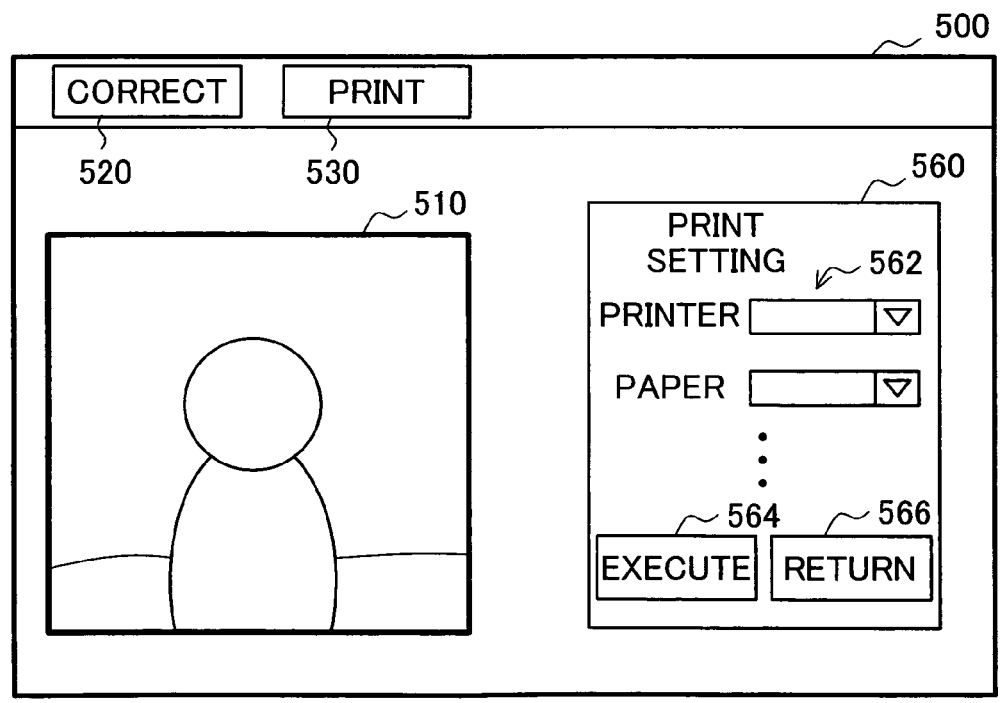
FIG. 7 is a diagram showing an example of a monitor display screen that appears during the image correction/print data generating process.

In step S150 (FIG. 2), the print selection instruction input unit 215 (FIG. 1) inputs a print selection instruction in response to user operation. A print selection instruction is an instruction to begin making various settings related to image printing. In this embodiment, a print selection instruction is input via the selection of the print selection button 530 in the monitor display screen 500 (FIG. 7). When the print selection button 530 is selected, a print setting dialog box 560 (FIG. 7) is displayed on the monitor display screen 500.

In step S160, the print setting instruction input unit 216 (FIG. 1) inputs a print setting instruction in response to user operation. A print setting instruction is an instruction to select, for example, the printer to be used for printing, the paper size, the paper type or the like. In this embodiment, a print setting instruction is input via the selection of the printer, paper size and the like from the setting input screen 562 (FIG. 7) in the print setting dialog box 560.

In step S170 (FIG. 2), the print execution instruction input unit 217 inputs a print execution instruction in response to user operation. A print execution instruction is a final instruction to begin printing. In this embodiment, a print execution instruction is input via the selection of the print execution button 564 in the print setting dialog box 560.

In step S180 (FIG. 2), the color space converter 218 (FIG. 1) generates device-dependent image data as print data by performing color space conversion with respect to the device-independent image data generated in step S135. This color space conversion is carried out based on the destination profile 244 (FIG. 1) for conversion from the L*a*b* color space to the printer RGB color space (RGBp color space). The generated device-dependent image data is expressed in the printer RGB color space. FIG. 3 shows a situation in which device-dependent image data (G'''dp) is generated via color space conversion of the device-independent image data generated in the previous step S135 (i.e., the image data G'''i) using the destination profile (DP) 244.

Where the correction process of step S130 is not once performed as indicated by the dashed arrow f3 in FIG. 2, the device-independent image data generated in step S115 is used for the color space conversion process of step S180 as indicated by the dashed arrow f4.

When the image correction/print data generating process shown in FIG. 2 is completed, the generated device-dependent image data as the image data is transmitted to the print processor 232 (FIG. 1). The print processor 232 executes various processes such as halftoning using the device-dependent image data as the print data and causes the printer 300 to print the image.

Here, in the computer 100 as the image processing device of this embodiment, the color space conversion process begun after the print execution instruction is input in step S170 (FIG. 2) is only the color space conversion from device-independent image data to device-dependent image data in step S180. In other words, the color space conversion from device-dependent image data to device-independent image data is initiated in step S135 (or step S115) prior to step S170. Therefore, in the computer 100 as the image processing device of this embodiment, the processing time associated with printing after input of a print execution instruction can be shortened.

Furthermore, in the computer 100 as the image processing device of this embodiment, because color matching is performed via the execution of two color space conversion operations using two profiles, rather than using a combined profile that combines the source profile 242 and destination profile 244, deterioration in the accuracy of color matching can be minimized.

B. Second Embodiment

Figure 8:
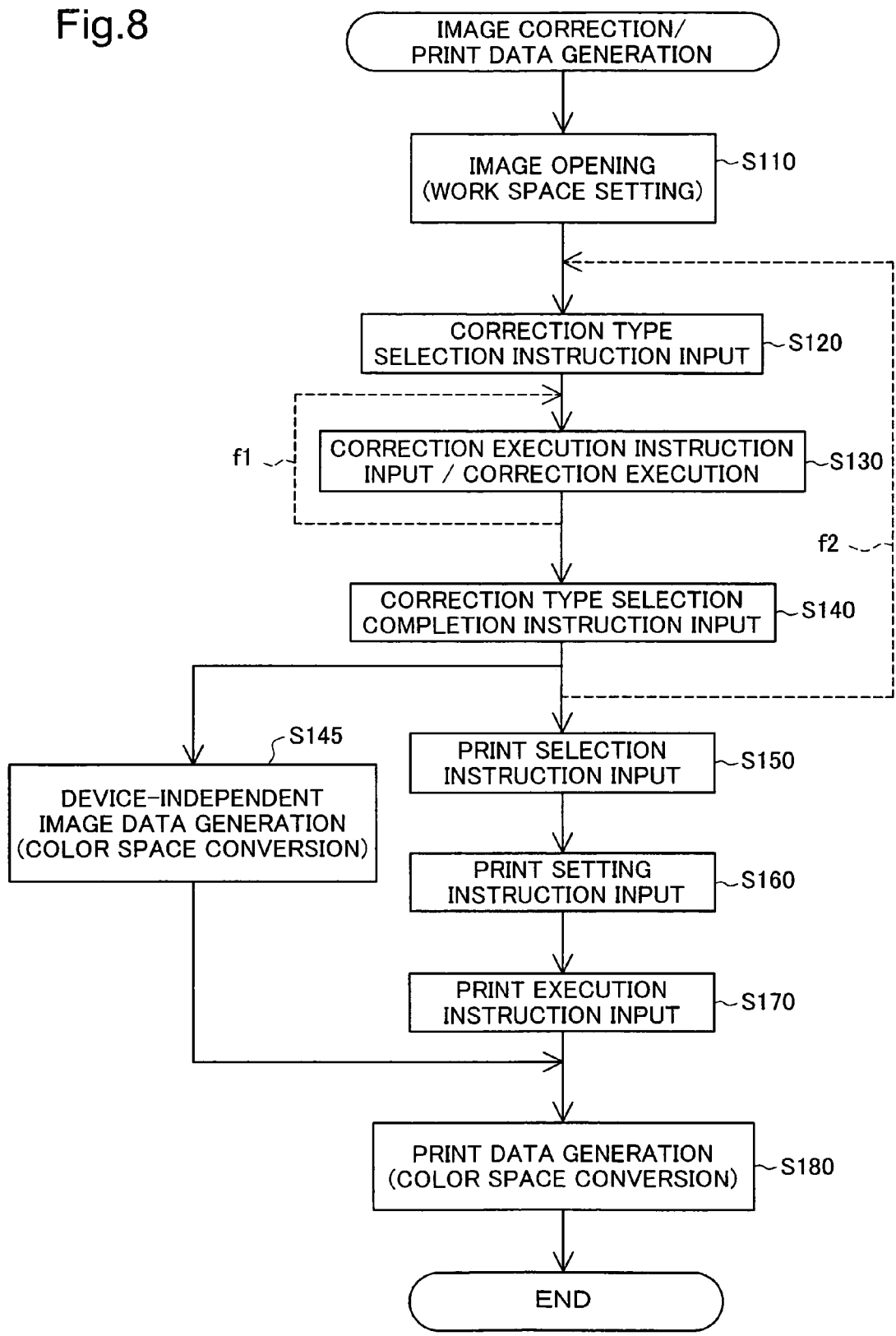
FIG. 8 is a flow chart showing the flow of the image correction/print data generating process executed by the image processing device in the second embodiment.
Figure 9:
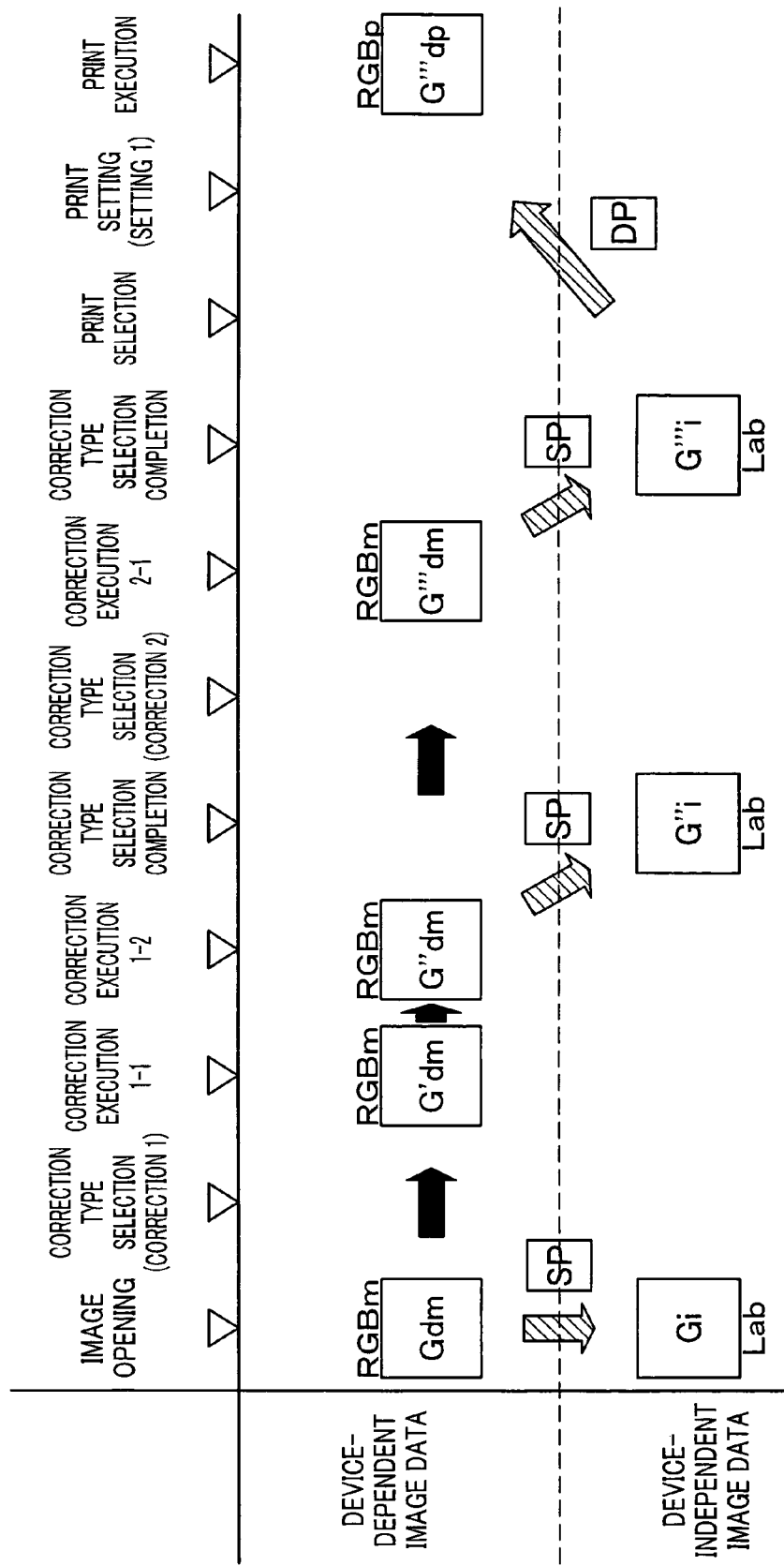
FIG. 9 is a diagram showing a summary of the image correction/print data generating process executed by the image processing device in the second embodiment.

FIG. 8 is a flow chart showing the flow of the image correction/print data generating process executed by the image processing device in the second embodiment. FIG. 9 is a diagram showing a summary of the image correction/print data generating process executed by the image processing device in the second embodiment. The image correction/print data generating process executed by the image processing device in the second embodiment differs from the corresponding process in the first embodiment in regard to the timing at which color space conversion processing to generate device-independent image data is initiated.

As shown in FIG. 8, color space conversion processing to generate device-independent image data is not begun even if the correction processing of step S130 has been completed. In the second embodiment, after a correction type selection completion instruction has been input in step S140, color space conversion processing is initiated (step S145). In the image correction/print data generating process of the second embodiment shown in FIG. 8, device-independent image data generation is not carried out immediately following image opening as in step S115 of the first embodiment (FIG. 2); however, device-independent image data generation may be carried out immediately following image opening in the second embodiment as well.

FIG. 9 shows a situation in which color space conversion from device-dependent image data (image data G"dm, for example) to device-independent image data (image data G"i, for example) is performed at the moment that the correction type selection completion instruction is input.

In the image correction/print data generating process of the second embodiment, the color space conversion process to convert device-dependent image data into device-independent image data is not begun each time a correction is completed, but is rather begun for the first time when it is determined via the input of a correction type selection completion instruction that a correction operation of a certain correction type has ended. As a result, in the second embodiment, where multiple correction operations are performed for a single correction type, the number of times that color space conversion processing is carried out can be minimized. For example, in the example shown in FIG. 9, the image G'dm generated via correction 1-1 does not undergo color space conversion processing.

As described above, in the computer 100 as the image processing device of the second embodiment as well, the color space conversion process begun after input of a print execution instruction (step S170 in FIG. 8) is only the color space conversion processing to convert device-independent image data into device-dependent image data. Consequently, the processing time associated with printing following input of a print execution instruction can be shortened. Furthermore, because color matching is carried out in the computer 100 of the second embodiment as well by executing two color space conversion operations using two profiles, rather than by using a combined profile that combines two profiles, deterioration in the accuracy of color matching can be prevented.

In addition, in the computer 100 of the second embodiment, where multiple correction operations using a single correction type are carried out, the number of times that color space conversion processing is performed to generate device-independent image data can be minimized.

C. Third Embodiment

Figure 10:
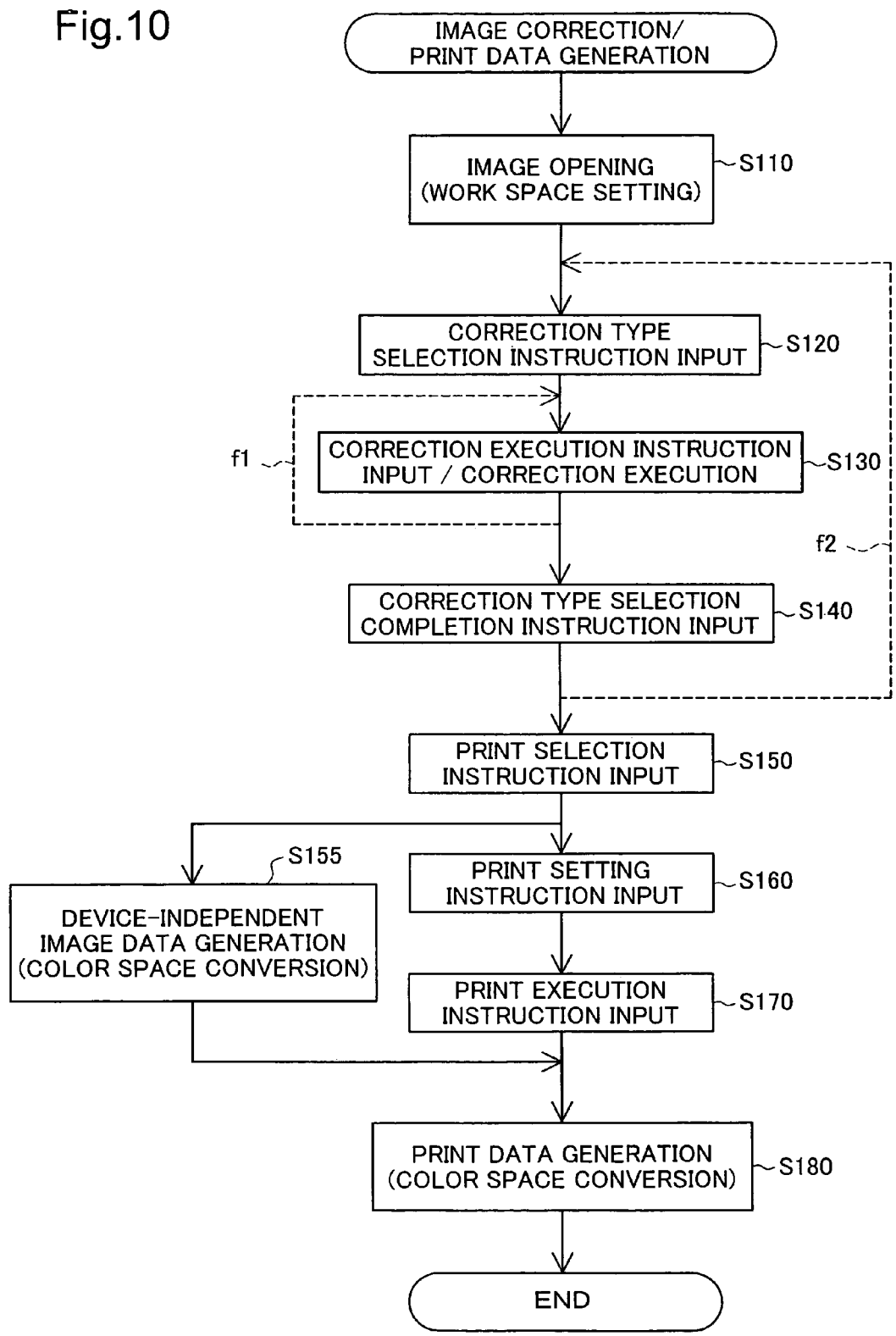
FIG. 10 is a flow chart showing the flow of the image correction/print data generating process executed by the image processing device in the third embodiment.
Figure 11:
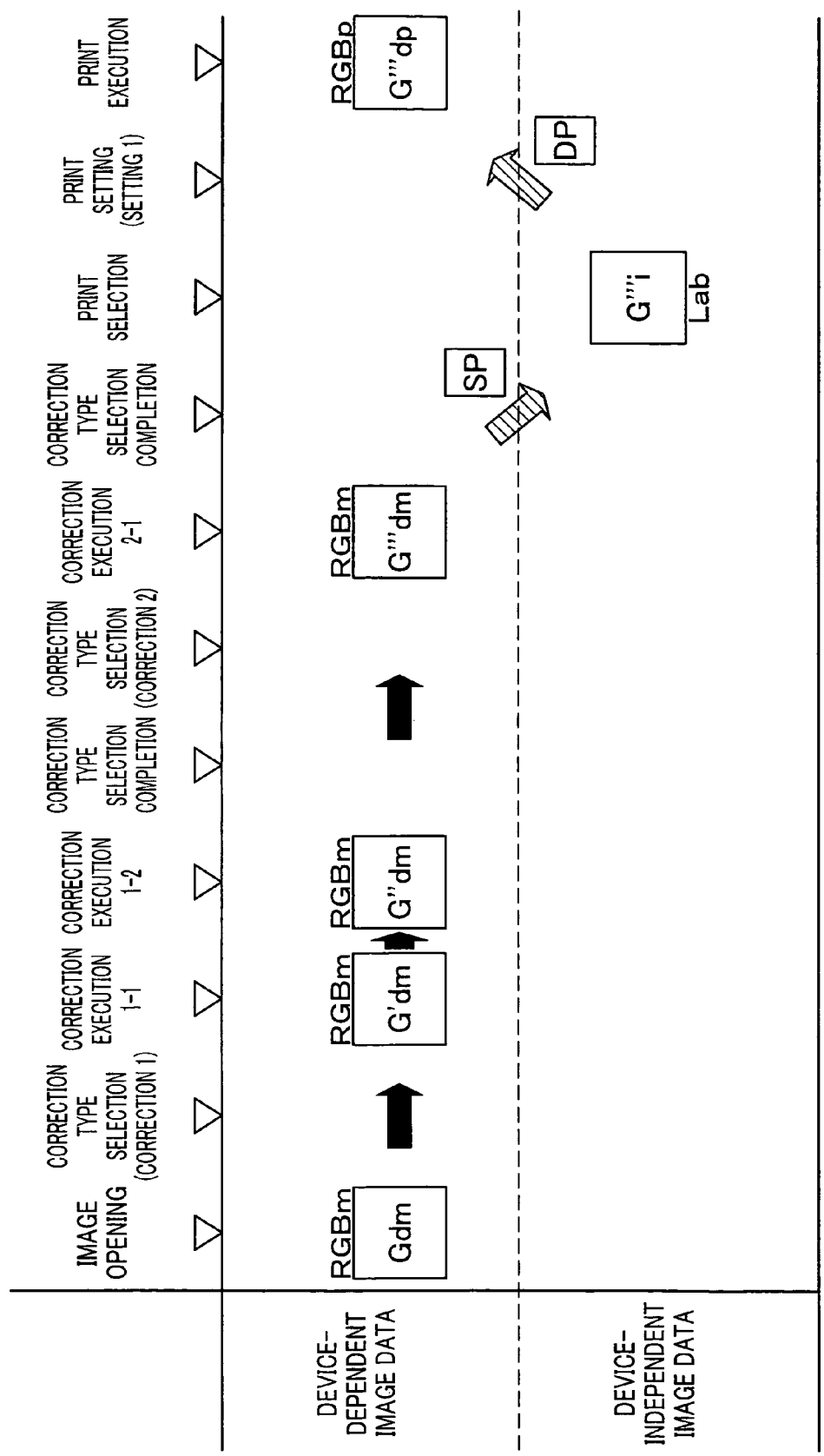
FIG. 11 is a diagram showing a summary of the image correction/print data generating process executed by the image processing device in the third embodiment.

FIG. 10 is a flow chart showing the flow of the image correction/print data generating process executed by the image processing device in the third embodiment. FIG. 11 is a diagram showing a summary of the image correction/print data generating process executed by the image processing device in the third embodiment. The image correction/print data generating process executed by the image processing device in the third embodiment differs from the corresponding process in the first embodiment in regard to the timing at which color space conversion processing to generate device-independent image data initiates.

As shown in FIG. 10, color space conversion processing to generate device-independent image data is not begun even if the correction processing of step S130 has been completed. In the third embodiment, after a print selection instruction has been input in step S150, color space conversion processing is initiated (step S155). In the image correction/print data generating process of the third embodiment shown in FIG. 10, device-independent image data generation is not carried out immediately following image opening as in step S115 of the first embodiment (FIG. 2), but device-independent image data generation may be carried out immediately following image opening in the third embodiment as well.

FIG. 11 shows a situation in which color space conversion from device-dependent image data (image data G'''dm) to device-independent image data (image data G'''i) is performed at the moment that a print selection instruction is input.

In the image correction/print data generating process of the third embodiment, the color space conversion process to convert device-dependent image data into device-independent image data is initiated for the first time when it is determined via the input of a print selection instruction that a user operation to print an image has begun. As a result, in the third embodiment, where multiple correction operations are performed for a single correction type or correction is performed for multiple correction types, the number of times that color space conversion processing is carried out can be minimized. For example, in the example shown in FIG. 11, the images G'dm and G"dm generated via corrections 1-1 and 1-2 respectively do not undergo color space conversion processing.

As described above, in the computer 100 as the image processing device of the third embodiment as well, the color space conversion process begun after input of a print execution instruction (step S170 in FIG. 10) is only the color space conversion processing to convert device-independent image data into device-dependent image data. Consequently, the processing time associated with printing following input of a print execution instruction can be shortened. Furthermore, because color matching is carried out in the computer 100 of the third embodiment as well by executing two color space conversion operations using two profiles, rather than by using a combined profile that combines two profiles, deterioration in the accuracy of color matching can be prevented.

In addition, in the computer 100 of the third embodiment, where multiple correction operations are performed for a single correction type or correction is performed for multiple correction types, the number of times that color space conversion processing is performed to generate device-independent image data can be minimized.

D. Fourth Embodiment

Figure 12:
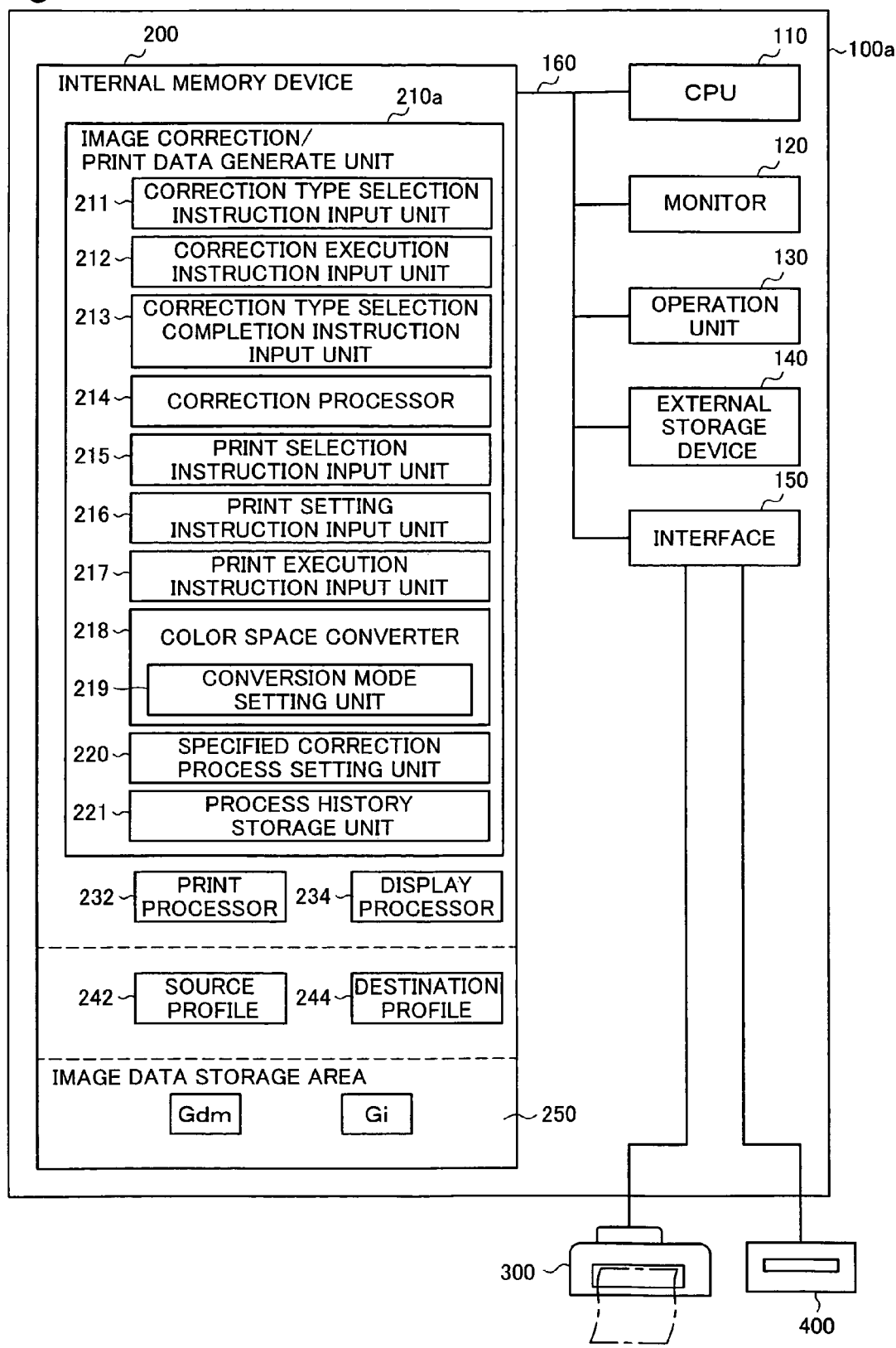
FIG. 12 is a block diagram showing schematically the construction of an image processing device in a fourth embodiment.

FIG. 12 is a block diagram showing schematically the construction of an image processing device in a fourth embodiment. The computer 100a as the image processing device of the fourth embodiment differs from the computer 100 of the first embodiment shown in FIG. 1 in that the image correction/print data generate unit 210a includes a specified correction process setting unit 220 and a process history storage unit 221. In addition, the fourth embodiment also differs from the first embodiment in that the color space converter 218 of the image correction/print data generate unit 210a includes a conversion mode setting unit 219.

Figure 13:
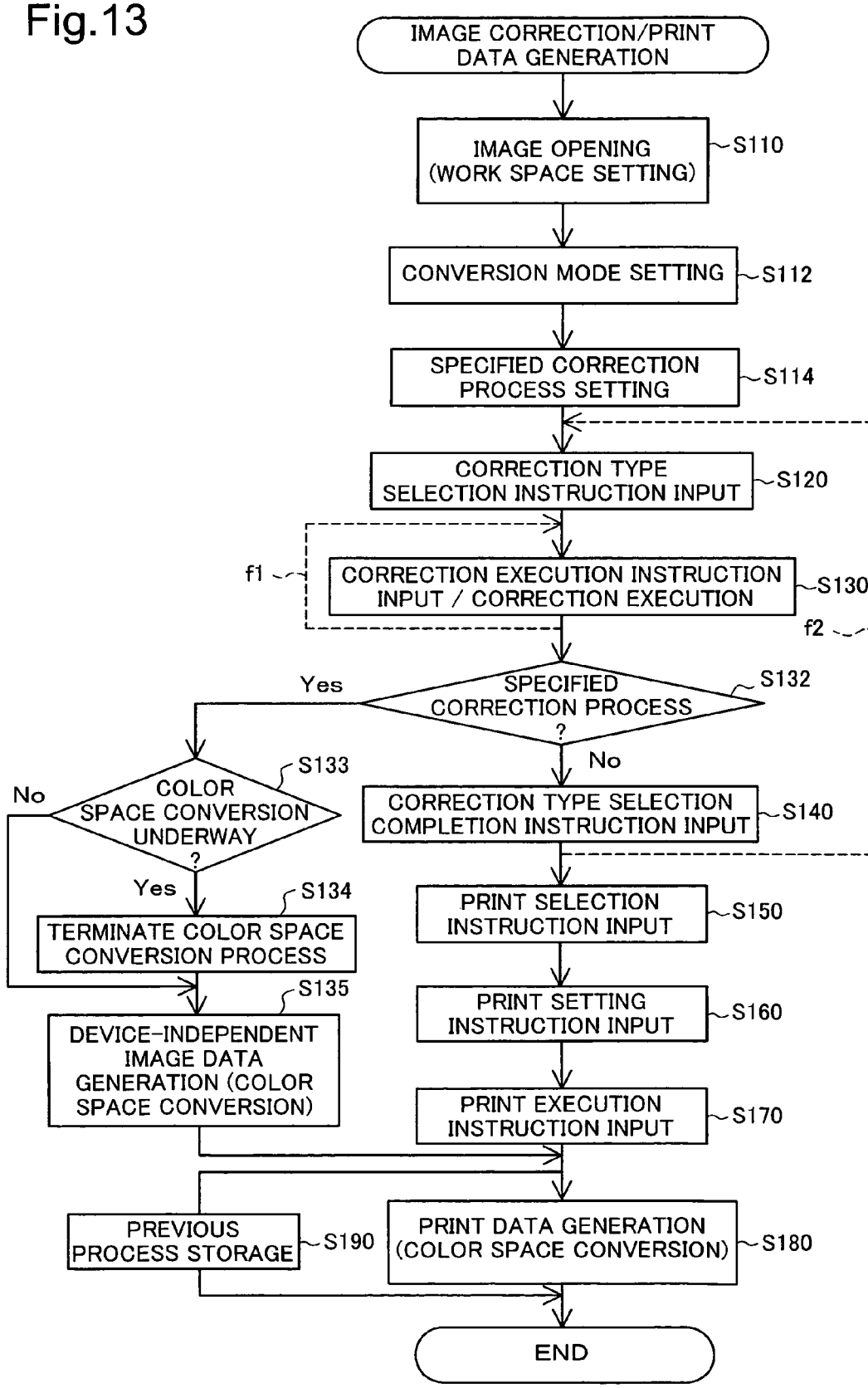
FIG. 13 is a flow chart showing the flow of the image correction/print data generating process executed by the image processing device in the fourth embodiment.
Figure 14:
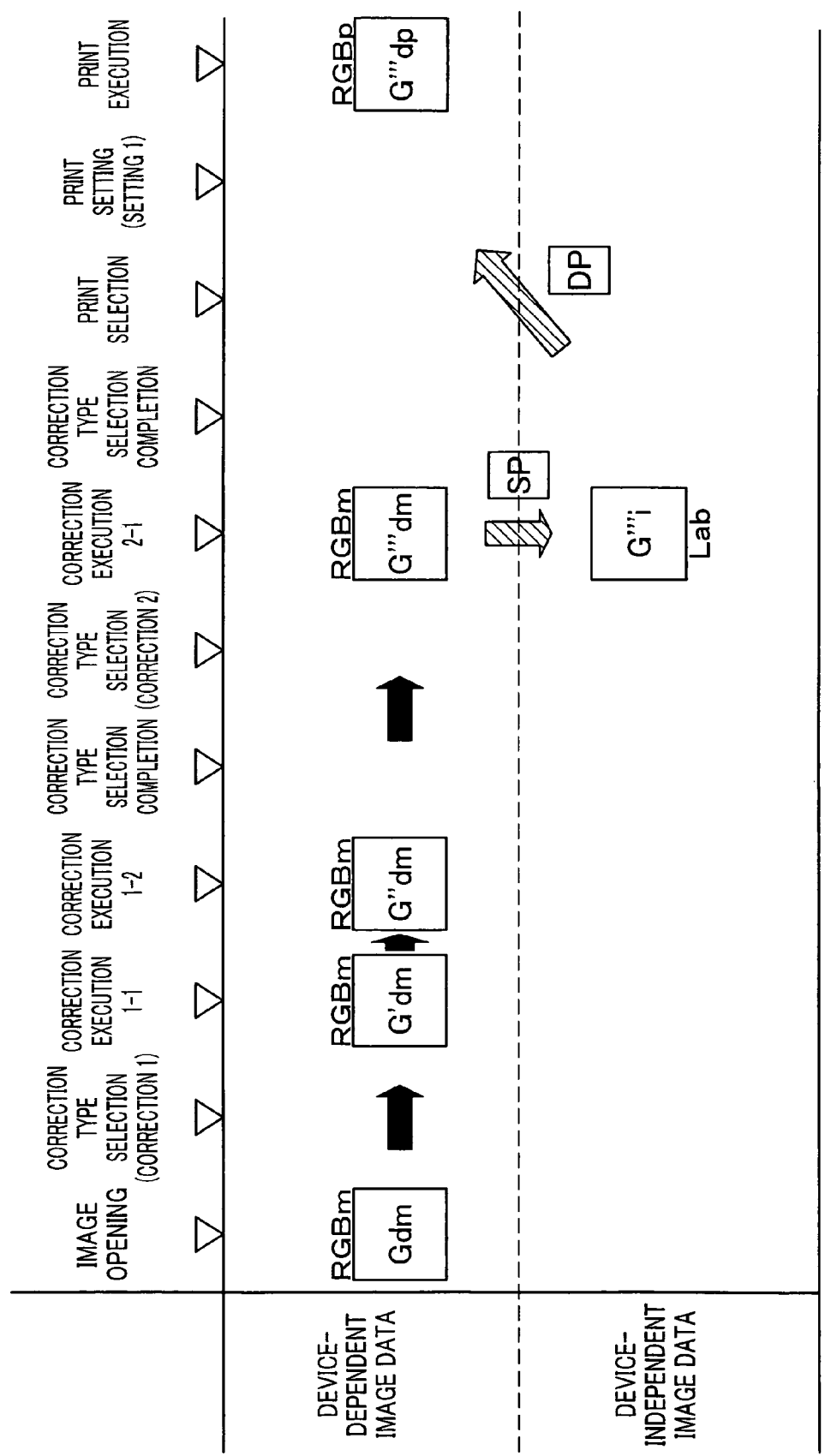
FIG. 14 is a diagram showing a summary of the image correction/print data generating process executed by the image processing device in the fourth embodiment.

FIG. 13 is a flow chart showing the flow of the image correction/print data generating process executed by the image processing device in the fourth embodiment. FIG. 14 is a diagram showing a summary of the image correction/print data generating process executed by the image processing device in the fourth embodiment. The image correction/print data generating process executed by the image processing device in the fourth embodiment differs from the corresponding process in the first embodiment shown in FIG. 2 in that it includes the execution of (i) conversion mode setting in step S112, (ii) specified correction process setting in step S114, (iii) specified correction process determination in step S132, (iv) determination as to whether color space conversion is underway during processing in step S133 and termination of color space conversion during processing in step S134, and (v) prior process storage processing in step S190.

In step S112 (FIG. 13), the conversion mode setting unit 219 (FIG. 12) sets the conversion mode. In the computer 100a of the fourth embodiment, any of multiple conversion modes having different timings for the initiation of color space conversion from device-dependent image data to device-independent image data may be set. The conversion modes include, for example, a mode in which color space conversion is initiated in response to the completion of correction processing in step S130 as in the first embodiment, a mode in which color space conversion is initiated in response to the input of a correction type selection completion instruction in step S140 as in the second embodiment, and a mode in which color space conversion is initiated in response to the input of a print selection instruction in step S150 as in the third embodiment. In this embodiment, a mode is set in which color space conversion is initiated in response to the completion of one or more specified correction processes described below. The conversion mode may be set by the conversion mode setting unit 219 in response to user operation or may be set using a default value.

In step S114 (FIG. 13), the specified correction process setting unit 220 (FIG. 12) sets the specified correction process (es). In this embodiment, 'specified correction process(es)' refers to one or more correction types among the multiple correction types that can be executed by the image correction/print data generate unit 210a, wherein color space conversion from device-dependent image data to device-independent image data is initiated in response to the completion of correction of the specified correction type(s). In other words, in this embodiment, color space conversion is initiated only if a specified correction type is completed, and is not initiated even if a non-specified correction type is completed. The specified correction process(es) may be set by the specified correction process setting unit 220 in response to user operation, but in this embodiment, a specified correction process is set in accordance with the history of prior processes stored in the process history storage unit 221 (FIG. 12) described below. The specific method of setting the specified correction process executed by the specified correction process setting unit 220 is described below.

In step S132 (FIG. 13) that follows step S130, the image correction/print data generate unit 210a (FIG. 12) determines whether or not the correction process executed in the previous step S130 was the specified correction process. If it is determined that the previous process was not the specified correction process, step S140 is executed. Here, color space conversion processing is not executed in response to the completion of correction. If it is determined that the previous process was the specified correction process, on the other hand, step S133 is executed.

In step S133 (FIG. 3), the image correction/print data generate unit 210a determines whether or not a color space conversion process is underway. If it is determined that a color space conversion process is underway, the image correction/print data generate unit 210a terminates the color space conversion process that is underway in step S134. The color space conversion process is terminated in this way because the color space conversion process that is underway is a color space conversion of device-dependent image data prior to the specified correction process carried out in the previous step S130, and once this device-dependent image data is generated after the specified correction process of step S130 is completed, this color space conversion process is no longer necessary.

In step S135 (FIG. 13), the color space converter 218 (FIG. 12) initiates color space conversion processing of the device-dependent image data resulting from the specified correction process, thereby generating device-independent image data.

In step S190 (FIG. 13) executed after the input of a print execution instruction in step S170, the process history storage unit 221 stores the previous process. Here, the 'previous process' refers to the type of correction executed in step S130 just prior to the input of the print execution instruction in step S170. In other words, the previous process is the last correction type executed prior to image printing. The process history storage unit 221 stores the history of these previous processes, and this stored previous process history is used during the setting of the specified correction process described above. The specified correction process setting unit 220 (FIG. 12) sets as the specified correction process the process having the highest frequency among the previous processes stored in the process history storage unit 221. If the specified correction process is set in this fashion, the probability that image printing will begin immediately after this specified correction process is completed can be increased, and the number of times that color space conversion processing is executed in order to generate device-independent image data can be efficiently minimized.

FIG. 14 shows a situation in which (i) even when correction that is not the specified correction type (i.e., correction 1-1 or correction 1-2) is performed, device-independent data is not generated, and (ii) when the specified correction process (correction 2-1) is executed, color space conversion processing is initiated with respect to the corrected image data (G'''dm) and device-independent image data (G'''i) is generated.

As described above, in the computer 100a as the image processing device of the fourth embodiment as well, the color space conversion process initiated after input of a print execution instruction (step S170 in FIG. 13) is only the color space conversion to convert device-dependent image data into device-independent image data. Consequently, the processing time associated with printing following input of the print execution instruction can be shortened. Furthermore, because color matching is carried out in the computer 100a of the fourth embodiment as well by executing two color space conversion operations using two profiles, rather than by using a combined profile that combines two profiles, deterioration in the accuracy of color matching can be prevented.

Moreover, in the computer 100a as the image processing device of the fourth embodiment, because a specified correction process is set and color space conversion processing to generate device-independent image data is initiated in response to the completion of only the specified correction process among all correction processes, the number of times that color space conversion processing is executed can be minimized.

In the computer 100a of the fourth embodiment, because the history of previous processes is stored and the previous process having the highest frequency of execution is set as the specified correction process, the processing time associated with printing following input of a print execution instruction can be shortened more reliably while minimizing the number of times that color space conversion processing is executed.

Furthermore, in the computer 100a of the fourth embodiment, when the specified correction process is executed, because any color space conversion processing underway at that time is terminated, unnecessary processing can be prevented.

In the computer 100a of the fourth embodiment, because a conversion mode can be set, the timing at which color space conversion process is performed can be appropriately selected based on the performance of the hardware resources, the size of the image to be processed or the like. For example, the user can select whether to limit the number of times that color space conversion is performed or shorten the time associated with printing following input of a print execution instruction.

E. Variations

The present invention is not limited to the embodiments and aspects described above. The present invention may be worked in various aspects within limits that involve no departure from the spirit of the invention; for example, the following variations are possible.

E1. Variation 1

In the fourth embodiment, processes such as conversion mode setting, specified correction process setting, determination of whether color space conversion is underway, cancellation of color space conversion, storage of previous process history and processing to reflect such history in the specified correction setting process are carried out. These processes may be executed in the first through third embodiments as well.

E2. Variation 2

In the above embodiments, the L*a*b* color space is used as the device-independent color space, but a different device-independent color space such as the XYZ color space may be used. Similarly, while the RGB color space is used as the device-dependent color space, a different device-dependent color space may be used.

E3. Variation 3

In the above embodiments, the color space converter 218 is a function (module) included in the image correction/print data generate unit 210, but the color space converter 218 may be a program separate from the image correction/print data generate unit 210. In this case, the image correction/print data generate unit 210 performs image correction/print data generation in tandem with the color space converter 218.

E4. Variation 4

In the above embodiments, the computer 100 as the image processing device performed image correction/print data generation using a printer as the output device, but the present invention may be applied to a situation in which the computer 100 executes an image correction/print data generating process that generates output data for a different type of output device, such as a monitor or projector.

What is claimed is:

1. An image processing device for generating output data used when an image displayed on a display device is to be output by an output device, the image processing device comprising:
   an output execution instruction input unit configured to input an instruction to execute image output via the output device; and
   a color space converter configured to carry out (i) a first conversion process that converts first device-dependent image data that expresses an image in a first device-dependent color space handled by the display device into device-independent image data that expresses the image in a device-independent color space, and (ii) a second conversion process that converts the device-independent image data into second device-dependent image data as the output data that expresses the image in a second device-dependent color space handled by the output device,
   wherein the color space converter initiates the first conversion process prior to an input of an instruction to execute output by the output execution instruction input unit, and initiates the second conversion process in response to the input of an instruction to execute output by the output execution instruction unit,
   the image processing device further comprising:
   a correction processer configured to correct image data,
   wherein the first device-dependent image data is image data resulting from correction processing by the correction processor, and
   the color space converter initiates the first conversion process in response to the completion of correction processing by the correction processor,
   wherein the correction processor can execute various types of correction processes, and
   the color space converter initiates the first conversion processing in response to the completion of a specified type of correction process among the various types of correction processes executed by the correction processor,
   the image processing device further comprising:
      a process history storage unit configured to, among the correction processes executed by the correction processor, record the type of correction process executed immediately prior to the input of an instruction to execute output,
      wherein the color space converter sets as the specified type of correction process the correction process that has been executed most frequently among the correction processes recorded in the process history storage unit.

2. An image processing device for generating output data used when an image displayed on a display device is to be output by an output device, the image processing device comprising:
   an output execution instruction input unit configured to input an instruction to execute image output via the output device; and
   a color space converter configured to carry out (i) a first conversion process that converts first device-dependent image data that expresses an image in a first device-dependent color space handled by the display device into device-independent image data that expresses the image in a device-independent color space, and (ii) a second conversion process that converts the device-independent image data into second device-dependent image data as the output data that expresses the image in a second device-dependent color space handled by the output device,
   wherein the space converter initiates the first conversion process prior to an input of an instruction to execute output by the output execution instruction input unit, and initiates the second conversion process in response to the input of an instruction to execute output by the output execution instruction unit,
   the image processing device further comprising:
   a correction processor configured to correct image data,
   wherein the first device-dependent image data is image data resulting from correction processing by the correction processor, and
   the color space converter initiates the first conversion process in response to the completion of correction processing by the correction processor,
   wherein when a correction process is initiated by the correction processor during the execution of the first conversion process initiated in response to the completion of a correction process by the correction processor, the color space converter terminates the first conversion process during execution thereof.

3. An image processing device for generating output data used when an image displayed on a display device is to be output by an output device, the image processing device comprising:

an output execution instruction input unit configured to input an instruction to execute image output via the output device; and a color space converter configured to carry out (i) a first conversion process that converts first device-dependent image data that expresses an image in a first device-dependent color space handled by the display device into device-independent image data that expresses the image in a device-independent color space, and (ii) a second conversion process that converts the device-independent image data into second device dependent image data as the output data that expresses the image in a second device-dependent color space handled by the output device, wherein the color space converter initiates the first conversion process prior to an input of an instruction to execute output by the output execution instruction input unit, and initiates the second conversion process in response to the input of an instruction to execute output by the output execution instruction unit, the image processing device further comprising:

a correction processor configured to perform various types of correction processes to image data;

a correction type selection instruction input unit configured to input a correction type selection instruction by which a desired type of correction process among the correction processes executed by the correction processor is selected; and a correction type selection completion instruction input unit configured to input a correction type selection completion instruction that ends the state in which correction type selection is carried out, wherein the color space converter initiates the first conversion process in response to an input of a correction type selection completion instruction via the correction type selection completion instruction input unit, and wherein, the color space converter initiates the first conversion process in response to the input of the correction type selection completion instruction pertaining to a specified type of correction process among the correction processes executed by the correction processor, the image processing device further comprising:

a process history storage unit configured to, among the correction processes executed by the correction processor, record the type of correction process executed immediately prior to the input of an instruction to execute output, wherein the color space converter sets as the specified type of correction process the correction process that has been executed most frequently among the correction processes recorded in the process history storage unit.

4. An image processing device for generating output data used when an image displayed on a display device is to be output by an output device, the image processing device comprising:

an output execution instruction input unit configured to input an instruction to execute image output via the output device; and a color space converter configured to carry out (i) a first conversion process that converts first device-dependent image data that expresses an image in a first device-dependent color space handled by the display device into device-independent image data that expresses the image in a device-independent color space, and (ii) a second conversion process that converts the device-independent image data into second device-dependent image data as the output data that expresses the image in a second device-dependent color space handled the output device, wherein the color space converter initiates the first conversion process prior to an input of an instruction to execute output by the output execution instruction input unit, and initiates the second conversion process in response to the in put of an instruction to execute output by the output execution instruction unit;

the image processing device further comprising:

a correction processor configured to perform various types of correction processes to image data;

a correction type selection instruction input unit configured to input a correction type selection instruction by which a desired type of correction process among the correction processes executed by the correction processor is selected; and a correction type selection completion instruction input unit configured to input a correction type selection completion instruction that ends the state in which correction type selection is carried out, wherein the color space converter initiates the first conversion process in response to an input of a correction type selection completion instruction via the correction type selection completion instruction input unit, and wherein when a correction type selection instruction is input by the correction type selection instruction input unit during the first conversion process executed in response to the input of the correction type selection completion instruction, the color space convener terminates the first conversion process during the execution thereof.

* * * * *